July 16, 1968   J. F. VAN VALKENBURG   3,392,940
SECURING DEVICE FOR DASH

Filed Oct. 28, 1966   4 Sheets-Sheet 1

INVENTOR.
JAMES F. VAN VALKENBURG

BY

ATTORNEY

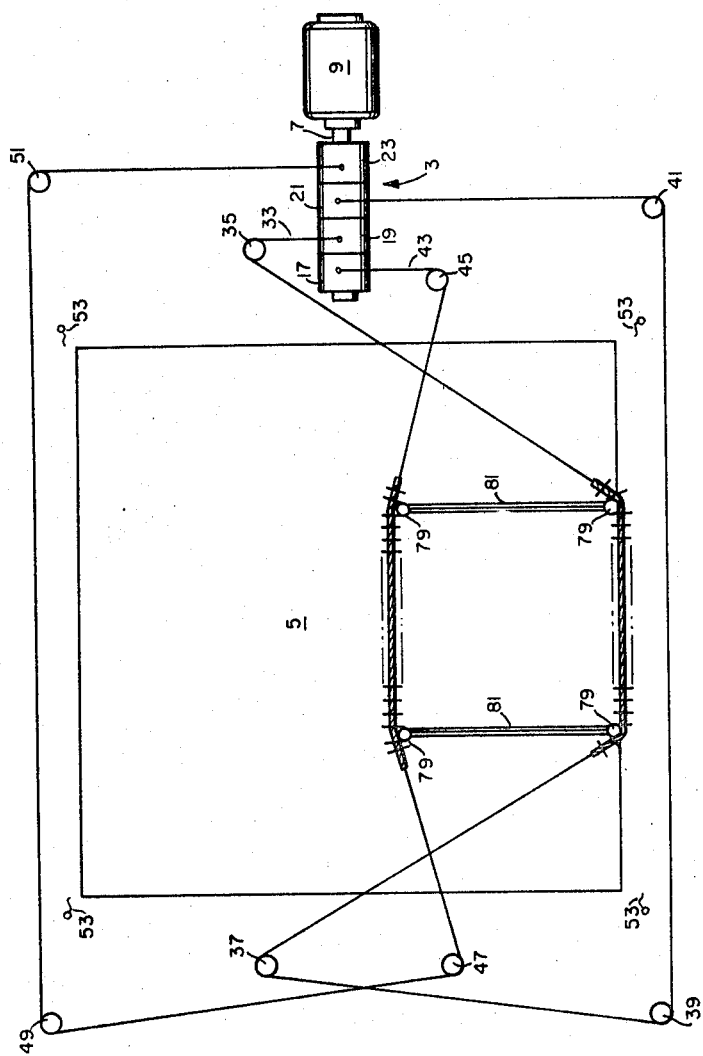

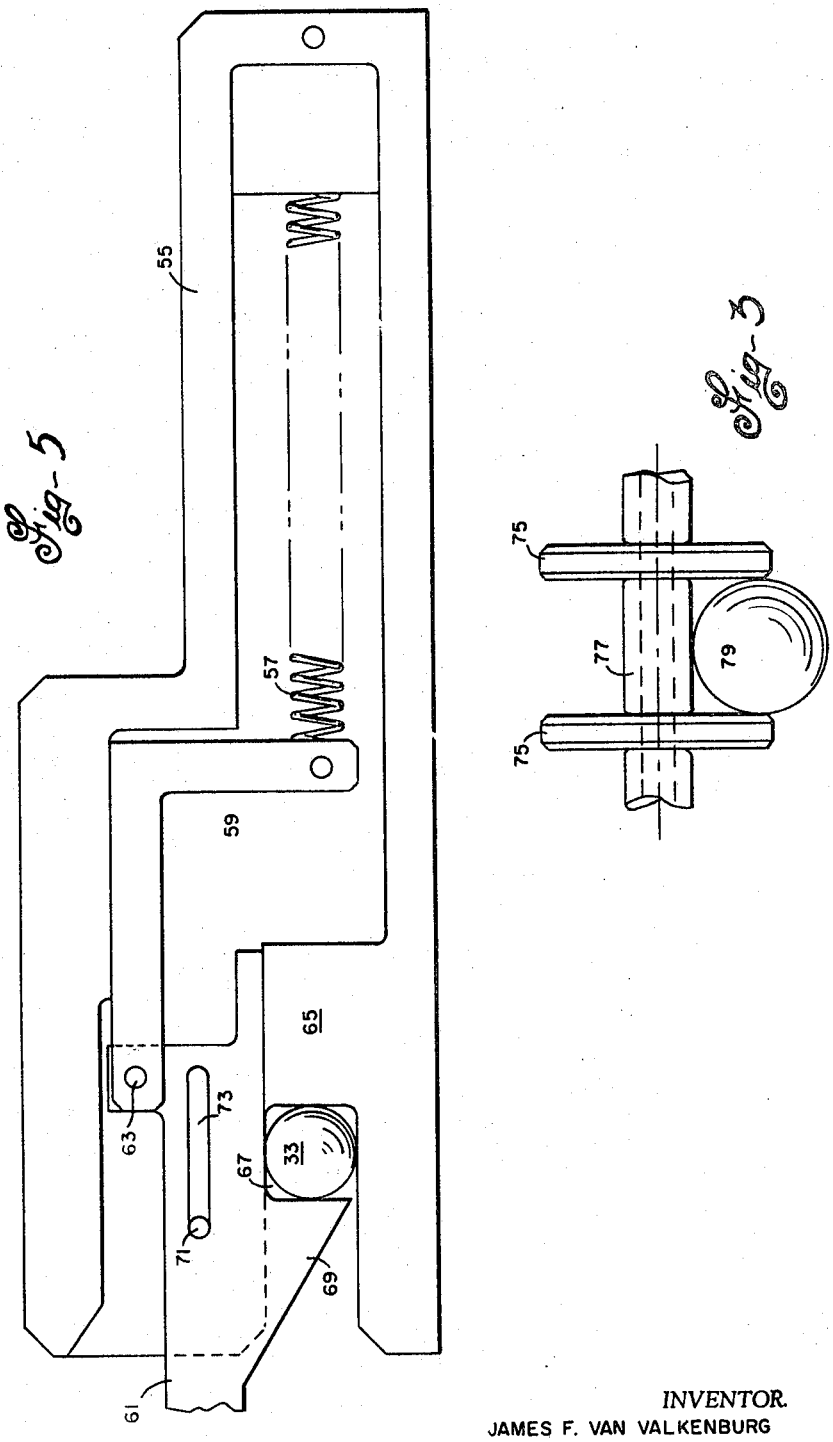

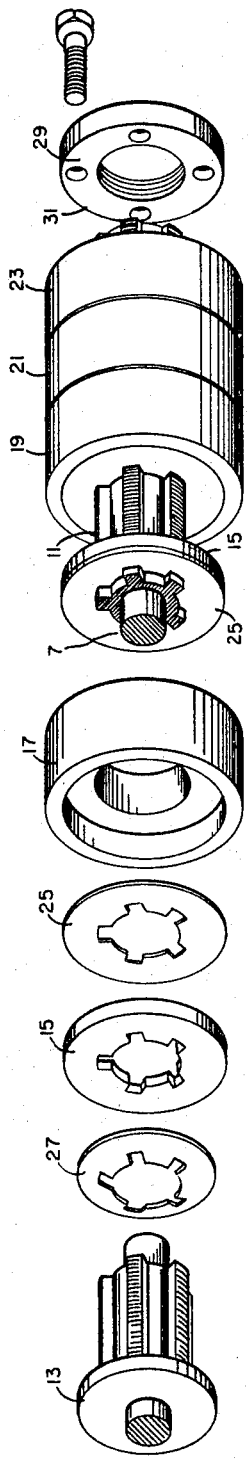

United States Patent Office 3,392,940
Patented July 16, 1968

3,392,940
SECURING DEVICE FOR DASH
James F. Van Valkenburg, Primos, Pa., assignor to the United States of America as represented by the Secretary of the Navy
Filed Oct. 28, 1966, Ser. No. 591,055
8 Claims. (Cl. 244—115)

ABSTRACT OF THE DISCLOSURE

The present invention relates to novel and improved apparatus for automatically anchoring or securing a drone or other type of helicopter to the surface on which it lands. The improved anchoring apparatus includes a drum assembly, a first cable system that extends from a first fixed point on the drum assembly along one edge of the landing surface back to a second fixed point on the drum assembly, a second cable system that extends from a third fixed point on the drum assembly along the opposite edge of the landing surface back to a fourth fixed point on the drum assembly, means for controlling rotation of the drum assembly, and means for maintaining portions of the cables along opposite sides of the landing surface in parallel until a predetermined amount of tension is applied to the cables.

---

Modern naval vessels of the destroyer and other similar types now often include a helicopter flight deck as standard equipment. Various procedures and apparatus have been used heretofore to secure the helicopters on the deck after a landing operation. Thus, for example, in accordance with one procedure which has been used heretofore, a line is lowered in response to a radio signal from the drone helicopter as it hovers over the flight deck. The line is then manually reeved through a pulley at the center of the landing area and about a windup drum on the ship. The line is then drawn taut and used as a vertical reference to aid in lowering the drone to the deck automatically. A portion of the line adjacent the helicopter contains a series of buttons which ratchet through the pulley and secure the drone to the deck. Such equipment, however, including its various sensitive electrical, electronic, and mechanical components, presents continuous maintenance and operational problems.

It is therefore a principal object of the present invention to provide novel and improved apparatus for automatically securing a helicopter to the surface on which it is landed.

It is a further object of the invention to provide novel and improved apparatus for automatically anchoring or securing a helicopter to its landing surface in a practical and effective way without the use of involved apparatus and sensitive technical equipment.

It is a further object of the invention to provide novel and improved apparatus for automatically anchoring or securing a helicopter to its landing surface with improved reliability and safety.

Other objects and many of the attendant advantages of this invention will be readily appreciated as the same becomes better understood by reference to the following detailed description when considered in connection with the accompanying drawing wherein:

FIG. 2 is a plan view of the invention shown in FIG. 1 of the drawing after the helicopter has landed and has been secured to the landing surface;

FIG. 3 is an enlarged view of the series of spaced disks on each of the helicopter engaging cables;

FIG. 4 is an exploded perspective view of the slip clutch drum assembly shown in FIGS. 1 and 2 of the drawing; and FIG. 5 is a detailed view of the hold back device shown in FIGS. 1 and 2 of the drawing.

Figure 1:
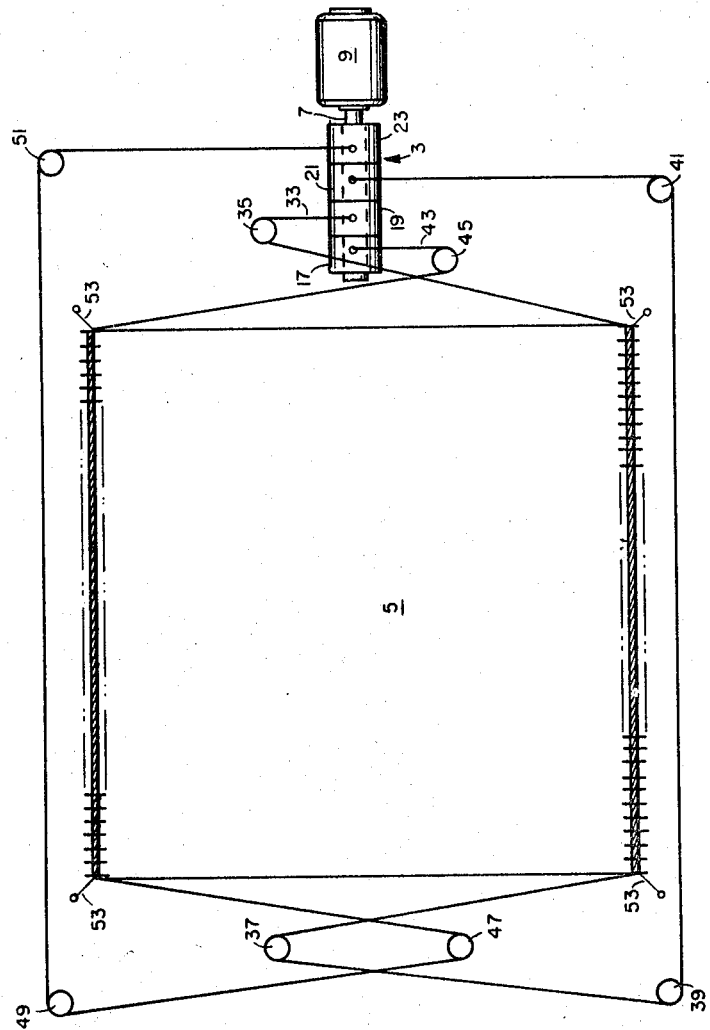
FIG. 1 is a plan view of a preferred embodiment of the present invention immediately before the helicopter lands on the prescribed landing surface.

Referring now to the various figures of the drawing, it will be noted that the drum assembly 3 is positioned to one side of the helicopter landing surface 5 preferably in a suitable opening or channel such that the upper peripheral surface of the drum 3 is substantially flush with the landing surface 5. The drum assembly 3 includes the elongated drive shaft 7, the rotation of which is controlled by the motor or other suitable drive mechanism 9. The oil impregnated sleeve or bushing 11, which is preferably flanged at 13, is keyed or otherwise secured to the shaft 7 and is splined as shown to receive the complementary splined inner peripheral surfaces of friction disks 15. Drum sections 17, 19, 21 and 23 are rotatably positioned on the outer periperal surface of the splined sleeve 11 between adjacent pairs of friction disks. Asbestos pads 25 are secured to surfaces of the friction disks that engage sections of the drum. The annular spring 27 and the adjustable annular plate 29 on opposite ends of the splined sleeve 11 control the amount of friction developed by the clamping action of the friction disks on the rotatable sections of the drum. A treaded outer portion of the splined sleeve 11 engages complementary threads 31 on plate 29 and prevents sliding axial movement of plate 29 along the outer peripheral surface of sleeve 11. Cable 33 is secured to section 19 of the drum assembly 3 and is directed by pulleys or the like 35, 37, 39 and 41 along one edge of the landing surface 5 back to the drum assembly where it is secured to section 21 thereof. Cable 43 is similarly secured to section 17 of the drum assembly and is directed by pulleys or the like 45, 47, 49 and 51 along the opposite edge of landing surface 5 back to the drum assembly 3 where it is secured to section 23 thereof.

Portions of cables 33 and 43 along opposite edges of the landing surface 5 are normally maintained in their parallel relationship by the holdback devices 53. Each holdback device includes an elongated enclosure or the like 55 and a latch assembly slidably disposed therein. The tension spring 57, which is attached between the inner end of the enclosure 55 and the L-shaped extension 59 of the latch assembly, biases the latch assembly toward an innermost position in enclosure 55. The cable latching lever 61 is pivotably secured to the L-shaped extension 59 at 63 and prior to release of the cable is maintained in substantial parallelism with the axis of the enclosure 55 as the lower surface of lever 61 engages or slides along the upper surface of the pedestal 65 that extends upwardly from the bottom of enclosure 55. As will be more apparent hereinafter, the cable 33 or 43 is normally secured in the notch 67 formed by the pedestal 65 and the wedge shaped downwardly projecting portion 69 of lever 61. Pin 71 which extends between opposite sides of enclosure 55 rides in slot 73 in lever 61 and facilitates smooth sliding movement of the lever 61 over the upper surface of pedestal 65.

Each of the cables 33 and 43 between their respective holdback devices 53 are provided with a plurality of disks 75 which are spaced one from another by a plurality of sleeves 77. The position of each series of alternating contiguous disks and spacers is confined to a predetermined portion of its associated cable along the edge of the landing surface 5 in any suitable manner. As will be more apparent hereinafter, adjacent disks 75 on the cables 33 and 43 readily engage spherical knuckles or fittings 79 which are attached to the ends of skids 81 of the helicopter to be secured.

In operation, when the drone or other helicopter is to be landed and secured to the confined landing surface 5, cables 33 and 43 are first positioned along opposite sides of the landing surface and secured in holdback devices 53. After the helicopter has landed, the motor 9 is energized and cables 33 and 43 are wound about the various sections of the drum 3 at a predetermined rate. As tension in the cables increases, the levers 61 of holdback devices 53 slide over the upper surfaces of pedestals 65 against the bias of springs 57. When the ends of levers 61 slide past the ends of their associated pedestals 65, the levers pivot at 71 on L-shaped members 59 and release the cables. Adjacent disks 75 of cables 33 and 43 then engage the spherical fittings 79 on the ends of skids 81 of the helicopter. Tension in the cables 33 and 43 about the helicopter then increases to a predetermined magnitude at which time the various sections of the drum clamped between the friction disks 15 of the drum assembly 3 begin to slip. Although not shown in the drawing, any suitable ratchet and pawl mechanism or the like could be provided to maintain tension in the cables after the motor 9 is de-energized without departing from the spirit or scope of the invention.

Obviously, many modifications and variations of the present invention are possible in the light of the above teachings. It is therefore to be understood that within the scope of the appended claims, the invention may be practiced otherwise than as specifically described.

What is claimed is:

1. Apparatus for securing a helicopter on a landing surface within a predetermined confined area, said apparatus comprising:
   (a) a drum assembly mounted so that its upper peripheral surface is substantially flush with the helicopter landing surface;
   (b) a first cable which is secured at one end to the drum assembly, extends along one edge of the landing surface, and is secured at its other end to the drum assembly;
   (c) a second cable which is secured at one end to the drum assembly, extends along an opposite edge of the landing surface, and is secured at its other end to the drum assembly;
   (d) means for controlling rotation of the drum assembly;
   (e) and means for maintaining portions of the cables along opposite sides of the landing surface in parallel relationship until a predetermined amount of tension is applied on the cables.

2. The apparatus substantially as described in claim 1 wherein a system of pulleys guides the cables from the drum assembly respectively along the sides of the landing surface back to the drum assembly.

3. The apparatus substantially as described in claim 1 wherein each cable includes a series of spaced disk assemblies secured to the portion of each cable that prior to the helicopter engaging operation extends along its respective edge of the landing surface.

4. The apparatus substantially as described in claim 2 wherein each cable includes a series of spaced disk assemblies secured to the portion of each cable that prior to the helicopter engaging operation extends along its respective edge of the landing surface.

5. The apparatus substantially as described in claim 1 wherein the drum assembly includes four separate segments connected to a common main drive shaft by slip clutch mechanisms.

6. The apparatus substantially as described in claim 2 wherein the drum assembly includes four separate segments connected to a common main drive shaft by slip clutch mechanisms.

7. The apparatus substantially as described in claim 3 wherein the drum assembly includes four separate segments connected to a common main drive shaft by slip clutch mechanisms.

8. The apparatus substantially as described in claim 4 wherein the drum assembly includes four separate segments connected to a common main drive shaft by slip clutch mechanisms.

References Cited

UNITED STATES PATENTS

| | | |
|---|---|---|
| 3,139,249 | 6/1964 | Trifillis. |
| 3,291,422 | 12/1966 | Van Valkenburg. |

FOREIGN PATENTS

| | | |
|---|---|---|
| 273,213 | 4/1914 | Germany. |
| 930,794 | 7/1963 | Great Britain. |

MILTON BUCHLER, *Primary Examiner.*

P. E. SAUBERER, *Assistant Examiner.*